United States Patent Office 2,826,593
Patented Mar. 11, 1958

2,826,593
10-UNDECENOATE OF TESTOSTERONE

George Rosenkranz and Enrique Batres, Mexico City, Mexico, assignors to Syntex S. A., Mexico City, Mexico, a corporation of Mexico No Drawing. Application September 5, 1957
Serial No. 682,259

Claims priority, application Mexico August 21, 1957

3 Claims. (Cl. 260—397.4)

The present invention relates to a novel cyclopentanophenanthrene derivative and to a process for the preparation thereof.

More particularly the present invention relates to the novel 10-undecenoate of testosterone and to the preparation of this compound. It is known to therapeutically utilize testosterone in the form of its esters in order to achieve the more prolonged action. For this purpose various esters of testosterone have been utilized as for example the propionate.

In accordance with the present invention it has been discovered that the 10-undecenoate ester of testosterone is superior to any other ester of testosterone in that it has a prolonged androgenic effect and is substantially superior, for example, to the enanthate of testosterone (a prolonged effect testosterone ester). Thus it has been found in accordance with the present invention that the 10-undecenoate ester of testosterone is a liposoluble compound which is absorbed slowly in the human organism and a single dose of this ester, corresponding to 5 mg. of free testosterone still showed a pronounced androgenic effect 125 days after its injection. As may be readily understood a compound having prolonged action of this type is of great value in those cases where androgenic compounds are desirably used. In accordance with the present invention it has been discovered that the 10-undecenoate of testosterone may be prepared from testosterone by treating the testosterone in pyridine solution with 10-undecenoyl chloride, first at room temperature for a substantial period of time and then for a short time by heating on a steam bath. The crude product is then purified by conventional means such as chromatography. The following equation illustrates the process of the present invention and the novel compound produced thereby.

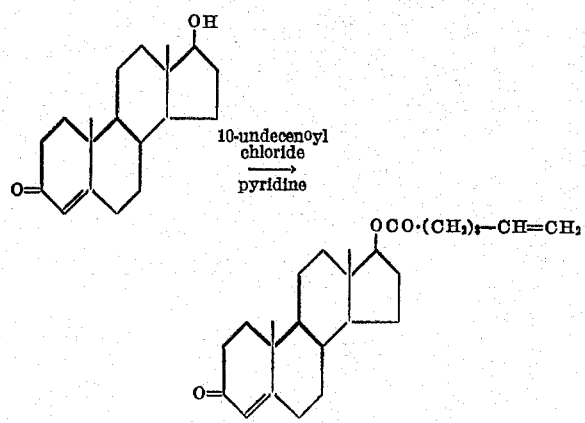

In practicing the invention above set forth testosterone is dissolved in pyridine and the solution is then cooled to a low temperature as for example 0° C. and the 10-undecenoyl chloride in molecular excess is then added dropwise over a short period of time. The mixture is then kept at room temperature for a period of time of the order of from 12 to 24 hours and thereafter heated on a steam bath for a short period of time of the order of 15 to 45 minutes. The reaction mixture is then cooled, poured into ice water and extracted with an organic solvent such as ether. The extract is then conventionally washed, dried, filtered and evaporated leaving a clear oil as a residue. The crude testosterone undecenoate thus produced is then chromatographed on neutral alumina to obtain the pure crystalline compound. The resultant novel 10-undecenoate of testosterone is a highly active androgenic compound having a prolonged androgenic activity. Thus the compound is substantially more active at the end of 125 days than the enanthate of testosterone which is an effective prolonged action androgenic hormone. The following table indicates a comparison of the prolonged androgenic activity of the novel 10-undecenoate of testosterone in comparison with the enanthate of testosterone. The test was carried out in a conventional manner for testing compounds of this type with a single injection in castrated rats and extended for a period of 125 days. The results indicated below are those found at the end of this period.

| Substance administered | Total dose, as the equivalent of free testosterone, mg. | Final weight of semial vesicles, mg. | Final weight of prostate, mg. |
|---|---|---|---|
| No injection (control) | | 5.2 | 10.4 |
| Testosterone enanthate | 5 | 40.6 | 82.5 |
| Testosterone undecenoate | 5 | 80.5 | 135.9 |

The following specific example serves to illustrate but is not intended to limit the present invention.

Example I 14.5 g. of testosterone was dissolved in 70 cc. of pyridine, the solution was cooled to 0° C. and treated dropwise in the course of 5 minutes with 10.3 g. (1.5 mols) of 10-undecenoyl chloride. The mixture was kept at room temperature for 15 hours and then heated on the steam bath for 30 minutes. After cooling, it was poured into 500 cc. of ice water and extracted several times with ether. The extract was washed with dilute hydrochloric acid, water, 5% sodium carbonate solution and with water to neutral, dried over anhydrous sodium sulfate, filtered and evaporated to dryness, thus leaving a clear oil as a residue.

This crude testosterone undecenoate was chromatographed on neutral alumina, whereupon the product was eluted with hexane-benzene 80:20 and 60:40. Crystallization from ether methanol afforded the pure testosterone 10-undecenoate, M. P. 56–57° C.; ultraviolet absorption: λ max. 240–242 mμ, log e 4.22; [α]$_D$ +77° (CHCl$_3$).

We claim:

1. A process for the preparation of the 10-undecenoate of testosterone which comprises reacting testosterone with the acid chloride of 10-undecenoic acid.

2. The process of claim 1 wherein the testosterone is treated in pyridine solution with the 10-undecenoic acid chloride at room temperature for from 12 to 24 hours followed by heating on a steam bath.

3. The 10-undecenoate of testosterone.

No references cited.